UNITED STATES PATENT OFFICE.

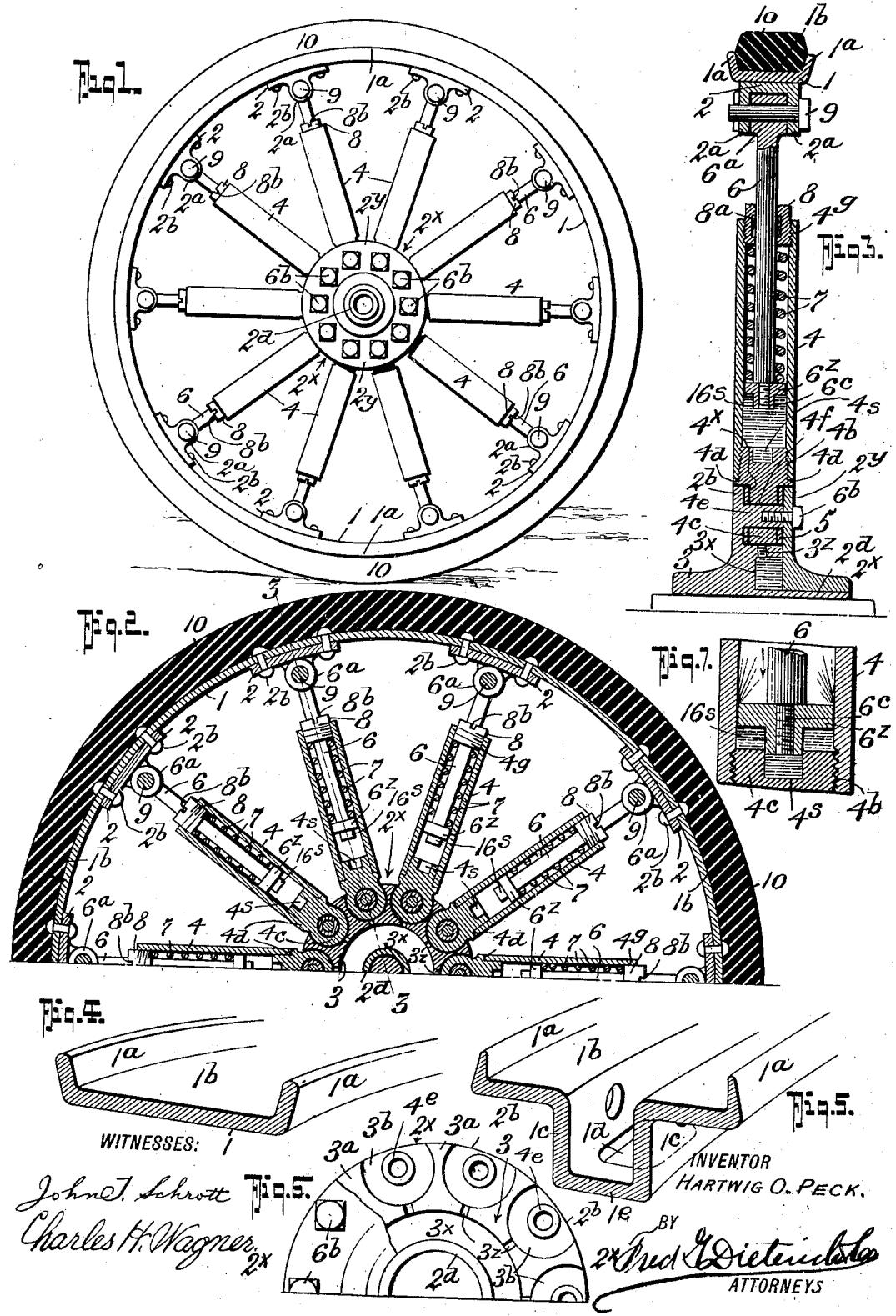

HARTWIG O. PECK, OF PORTLAND, OREGON, ASSIGNOR, BY DIRECT AND MESNE ASSIGNMENTS, TO H. O. PECK AUTOMOBILE WHEEL COMPANY, OF PORTLAND, OREGON, INCORPORATED.

VEHICLE-WHEEL.

No. 925,022.          Specification of Letters Patent.          Patented June 15, 1909.

Application filed July 9, 1908. Serial No. 442,715.

*To all whom it may concern:*

Be it known that I, HARTWIG O. PECK, residing at Portland, in the county of Multnomah and State of Oregon, have invented certain new and useful Improvements in Vehicle-Wheels, of which the following is a specification.

My invention relates to certain new and useful improvements in vehicle wheels, and in its generic nature the invention embodies a wheel of the spring-spoke type, consisting of an improved construction of spoke, rim and hub and means for coöperatively connecting the three parts in such manner as to afford an efficient construction of vehicle wheel of this type.

In its more detail nature, the invention embodies those novel details of construction, combination and arrangement of parts, all of which will be first described and then specifically pointed out in the appended claims, reference being had to the accompanying drawings, in which:—

Figure 1, is a side elevation of a vehicle wheel embodying my invention. Fig. 2, is a central vertical longitudinal section of one-half of the wheel. Fig. 3, is a transverse section on the line 3—3 of Fig. 2. Fig. 4, is a detail perspective section of a part of one form of rim. Fig. 5, is a similar view of another form of rim. Fig. 6, is a detail side elevation of a part of the hub. Fig. 7, is an enlarged detail view illustrating more fully a part of my invention.

Referring now to the accompanying drawings in which like letters and numerals of reference indicate like parts in all of the figures, 1 designates the rim which is provided with the side flanges $1^a$ to form a tire receiving peripheral groove $1^b$ in which the tire 10 may be held, the tire 10 being of any approved construction.

In the form of my rim shown in Fig. 5, the same is provided with a central channel formed by depressed portions $1^c$ that are connected by a web $1^e$, the channel being apertured at intervals as at $1^d$ to permit passage of the end of the spoke. The spokes have portions 6 terminating in heads $6^a$, which are held in the channel of the rim and fulcrumed on pins or bolts 9, as indicated. When the form of rim shown in Fig. 4, is used, however, the central channel is omitted, and in lieu of the pendent portions $1^c$, I provide spoke attaching clips 2, which are riveted as at $2^b$ to the rim portion 1, and which have pendent ears $2^a$ apertured to permit passage of the pin 9 that secures the spoke section 6 in place.

The hub $2^x$ of my improved wheel consists of the central hollow spindle $2^d$ that is surrounded by the body 3 that has a central pocket $3^x$ for a purpose presently explained. The body 3 is also provided with a series of radial members or projections $3^a$ that form spoke sockets $3^b$ of circular form, the sockets $3^b$ being arranged to receive the ends $4^c$ of the spokes 4.

$2^b$ designates a side disk integrally formed with the body 3 and having lugs $4^e$ projected centrally into the pockets $3^b$ to receive the apertured ends $4^f$ of the spokes 4, and a second disk $2^y$ is fitted over the tubular spindle $2^d$ against the body 3 to close the sides of the sockets $3^b$.

The lugs $4^e$ have internally threaded apertures to receive the screws $6^b$ which pass through the free disk $2^y$ and retain the same in place, the screws $6^b$ having hexagonal heads, as shown.

The pocket $3^x$ may be used as a grease container and the body 3 may have minute channels or perforations connecting the pocket $3^x$ with the sockets $3^b$, as indicated by the reference numeral $3^z$ in the drawings.

The spokes in my present invention consist of the tubular casing 4, threaded at the hub end $4^b$ to receive the head $4^c$, the head $4^c$ having a shoulder portion $4^d$ to limit its movement into the casing 4, as clearly indicated in Fig. 3, and having an aperture $4^f$ to permit passage of the pins $6^b$. The heads $4^c$ are also countersunk on the sides as at $4^x$ to permit of the insertion of washer-disks 5 around the pin $6^b$ which serve to prevent wear on the heads $4^c$ when the spokes are secured in place on the hub.

The end of the casing section 4 adjacent to the rim is screw threaded at $4^g$ to receive the plugs 8, the plugs 8 having internal chambers $8^a$ to receive suitable packing material and having external wrench receiving portions $8^b$, as indicated, the plugs 8 being centrally apertured also, to permit passage of the spoke section 6 which projects into the casing 4 and have threaded ends $6^c$ to receive the collars $6^z$, between which and the plug 8, the compression spring 7 is located.

The casing 4 may be filled with a suitable lubricant if desired so as to keep the parts well oiled.

The heads 4ᶜ may have countersunk portions 4ˢ to snugly receive the projections 16ˢ of the collars 6ᶻ and to serve as collection pockets for the hub so that should the projections 16ˢ be forced into the countersunk portion 4ˢ the lubricant will form a cushion and at the same time be squirted from the countersunk portion 4ˢ into the spoke casing and assist in the full lubrication of the parts.

In the practical application of my invention the spokes, hub and rim are assembled as shown in the drawings and in a manner well known to those skilled in the art to which the invention appertains. It will be seen that as the wheel is run, the spokes will have pivotal movement on the pins 6ᵇ and 9, and consequently allow a free and easy movement or riding of the vehicle. The washers 5 will serve to prevent undue wear on the head 4ᶜ and may be renewed from time to time, as may be required.

From the foregoing description taken in connection with the accompanying drawings it is thought the complete construction, operation and advantages of my invention will be readily understood by those skilled in the art to which the invention appertains.

What I claim is:

1. In a vehicle wheel, a hub consisting of a fixed disk and a body portion integrally formed therewith, a tubular spindle formed with said disk and body portion, said body portion having a series of radial projections to form circular pockets, a removable disk held on said spindle against said body portion, spokes having apertured heads held in said sockets, lugs integrally formed with said first mentioned disk and projecting centrally in said sockets and through said spoke head, and bolts passing through said removable disk and threaded into said lugs.

2. In a vehicle wheel, a hub consisting of a fixed disk and a body portion integrally formed therewith, a tubular spindle formed with said disk and body portion, said body portion having a series of radial projections to form circular pockets, a removable disk held on said spindle against said body portion, spokes having apertured heads held in said sockets, lugs integrally formed with said first mentioned disk and projecting centrally in said sockets and through said spoke heads, bolts passing through said removable disk and threaded into said lugs, said body portion having a central pocket, and means communicating between said central pocket and said sockets.

3. In a vehicle wheel, a rim, a series of resilient spokes secured thereto, a hub to which the spokes are also secured, said spokes comprising a tubular section and a section telescoped into the tubular section, a closure head for one end of the tubular section having countersunk washer receiving portions, a hub having lugs to pass through apertures in said heads, washers mounted on said lugs to engage said heads, said piston portion of the spoke having a projection and said head having a pocket to snugly fit said projection, and a fluid held in said tubular portion of the spoke and adapted to be squirted by the said projection of the piston portion of the spoke when it enters the pocket of the head and springs within the tubular portion to cooperate with the piston portion of the spoke.

4. A vehicle wheel, a resilient spoke comprising a tubular member, threaded at each end and a rod telescoped into said tubular member, a closure plug threaded into one end of said tubular casing and an adjustable gland plug threaded into the other end of the casing and surrounding said rod, a piston within the casing carried by said rod and of a diameter to snugly fit within the casing, said first mentioned closure plug having a pocket, said piston having a projection to snugly fit said pocket and a fluid held within said casing to be squirted past the piston as compression takes place ahead of the piston, together with a spring held within the casing between the piston and the adjustable gland plug.

5. In a vehicle wheel, a hub comprising a fixed disk and a body portion integrally formed therewith, a tubular spindle formed with said disk and body portion, said body portion having a series of radial projections to form pockets, a removable disk held on said spindle against said body portion, said body portion having an annular pocket surrounding said spindle, said body portion having apertures between said annular pocket and the radial pockets, said annular pocket adapted to contain a lubricant and communicate the same to the radial pockets, said radial pockets adapted to receive the ends of the wheel spokes, and means for retaining the spokes within said pockets.

H. O. PECK.

Witnesses:
C. M. FENNO,
GEO. L. ROUTLEDGE.